United States Patent [19]

Ford et al.

[11] Patent Number: 5,418,496

[45] Date of Patent: May 23, 1995

[54] SERIAL DATA CLOCK RECOVERY CIRCUIT USING DUAL OSCILLATOR CIRCUIT

[75] Inventors: David Ford; Emil N. Hahn, both of Gilbert; Michael D. Reed, Mesa; Nandini Srinivasan, Chandler; Philip A. Jeffrey, Tempe, all of Ariz.

[73] Assignee: Motorola, Inc., Schaumburg, Ill.

[21] Appl. No.: 192,521

[22] Filed: Feb. 7, 1994

[51] Int. Cl.$^6$ .......................... H03L 7/099; H04L 7/08
[52] U.S. Cl. .......................................... 331/2; 331/25; 331/48; 331/55; 331/56; 331/DIG. 3; 375/363; 375/376
[58] Field of Search .................... 331/2, 25, 46, 48, 49, 331/55, 56, DIG. 3; 375/106, 110, 111, 112, 119, 120

[56] References Cited

U.S. PATENT DOCUMENTS

| | | | |
|---|---|---|---|
| 4,523,158 | 6/1985 | Megeid | 331/55 |
| 4,633,488 | 12/1986 | Shaw | 331/1 A X |
| 5,237,290 | 8/1993 | Banu et al. | 331/2 |

OTHER PUBLICATIONS

Banu et al., "TA 6.4: a 660 Mb/s CMOS Clock Recovery Circuit with Instantaneous Locking for NRZ Data and Burst-Mode Transmission", Jan. 1993 IEEE International Solid State Circuits Conference.

Banu et al., "Clock Recovery Circuits with Instantaneous Locking", Nov. 5, 1992, vol. 28, No. 23, Electronics Letters, pp. 2127–2130.

*Primary Examiner*—Siegfried H. Grimm
*Attorney, Agent, or Firm*—Gary W. Hoshizaki

[57] ABSTRACT

A serial data clock receiver circuit (11) is provided that synchronizes a clock signal to data. The serial data clock receiver circuit (11) comprises a control circuit (21), a dual oscillator circuit (19), and a phase locked loop circuit (22). The control circuit (21) arms the dual oscillator circuit (19) for being enabled during an idle period. The phase locked loop circuit (22) provides a reference voltage for the dual oscillator circuit (19). The dual oscillator circuit (19) is responsive to both the data and control circuit (19) for providing a clock signal.

18 Claims, 6 Drawing Sheets

SERIAL DATA CLOCK RECOVERY CIRCUIT USING DUAL OSCILLATOR CIRCUIT

BACKGROUND OF THE INVENTION

This invention relates, in general, to high speed digital communication, and more particularly, to non-return to zero (NRZ) serial data receiver clock synchronization.

High speed communication lines are capable of sending data at extremely fast rates. For example, NRZ data is sent as a stream of bit logic levels at speeds approaching 1.8 gigahertz. The high speed of data transfer imposes significant constraints on the tolerances of circuitry receiving data. One problem is the waveform of the data itself at high frequencies. The data does not appear as a pulse with well defined edge transitions, but looks more like a sine-wave at high frequencies. Error in detecting the logic state of such a data waveform is minimized by sampling the waveform in the middle of the data bit period as illustrated in FIG. 1.

NRZ data is sent at a predetermined frequency. The sender (or data transmitter) typically has an accurate oscillator operating at the predetermined frequency. The receiver has its own oscillator operating at the same predetermined frequency. The receiver must know the data phase and frequency to detect the logic state in the middle of the data bit period. The data phase is only revealed by data transitions. The phase can be lost without data transitions because the receiver oscillator drifts with respect to the sender oscillator.

One approach to insure synchronization is to use dual gated slave oscillators that resynchronize the clock phase to incoming data transitions. A first example of such a system is described in "A 660 Mb/s CMOS Clock Recovery Circuit with instantaneous Locking for NRZ Data and Burst-Mode Transmission" by Mihai Banu and Alfred Dunlop, from the 1993 IEEE International Solid-State Circuits Conference which is hereby incorporated by reference. A second example is described in "Clock Recovery Circuits with Instantaneous Locking" by Mihai Banu and Alfred Dunlop, from Electronic Letters, Nov. 5th 1992, Vol. 28, No. 23, which is hereby incorporated by reference. The dual gated slave oscillators are started and stopped by a transitioning input signal. But it is important to note that only one oscillator operates at any time. The circuitry forces each oscillator to be in phase synchronization with the data once it is started.

A problem may occur when the data does not transition for an extended period of time. The NRZ data is asynchronous with respect to the clock of the receiver. If the clock drifts during the extended period of time a condition of metastability may occur. Metastability is a condition where clock and data are asynchronous with one another. A physical link protocol has been developed to eliminate this problem. A sync bit is inserted before each data byte to insure the receiver clock remains phase coherent with the NRZ data.

There will be times when the communication lines are idle. A free running receiver clock will drift during the idle time. The receiver clock becomes asynchronous with data that is input after the idle time. If this occurs there is a possibility of metastability. A sync bit cannot be used during the idle time because the receiver circuit would assume that data is being transmitted.

Hence, it would be of great benefit if a serial data receiver clock synchronization circuit could be developed which eliminates the possibility of metastability after an idle period in data transmission.

DETAILED DESCRIPTION OF THE DRAWINGS

Non-return to zero (NRZ) data may be transmitted from a sender to one or more receivers at extremely high speeds. NRZ data is characterized by the fact that the data need not transition between data bits. Both a transmitter and a receiver are internally clocked. A receiver must know the clock phase and frequency at which a sender is transmitting data to receive the data correctly. A logic level of an incoming data bit is sensed at a predetermined time within a clock cycle to maximize the signal/noise ratio. The predetermined time is typically midpoint within the clock cycle. Synchronization between a receiver clock and incoming data is an essential part of data retrieval.

In the preferred embodiment, crystal oscillators are used to generate accurate clock frequencies in a transmitter and a receiver. Although the oscillators are extremely accurate they will not produce exactly identical clock signals. If the clocks are initially synchronized at the start of a data transmission, the receiver clock will drift in time from the transmitter clock. The receiver clock being asynchronous to the transmitter clock could lead to erroneous logic levels being sensed by a receiver circuit.

Drift between the transmitter and receiver clocks is minimized by resynchronizing the receiver clock to the transmitter clock with every data transition. Resynchronization does not prevent drift between the transmitter and receiver clocks during a period when no data transition occurs. A solution to this problem is a data transmission protocol requiring a synchronization bit (sync bit) sent before each data byte. The receiver clock signal is resynchronized to the incoming data each time a sync bit is received. Thus, periodically spacing sync bits with data insures a maximum drift of a receiver oscillator that can occur before data and the clock signal are resynchronized.

Figure 1:
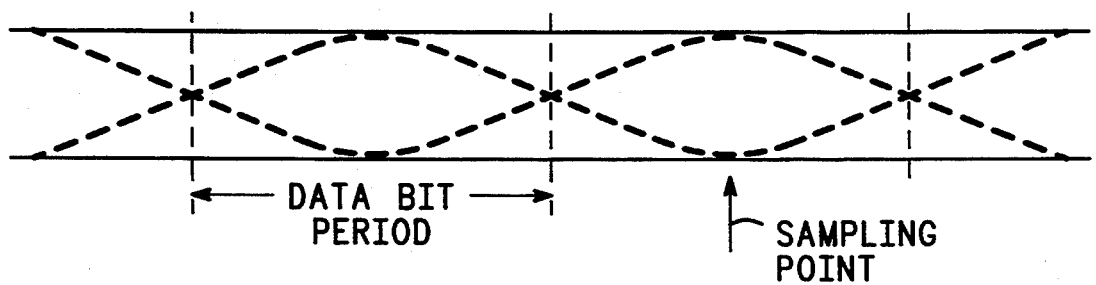
FIG. 1 is an illustration of high speed transmitted data bits and the optimum point for sensing a logic level thereof.
Figure 2:
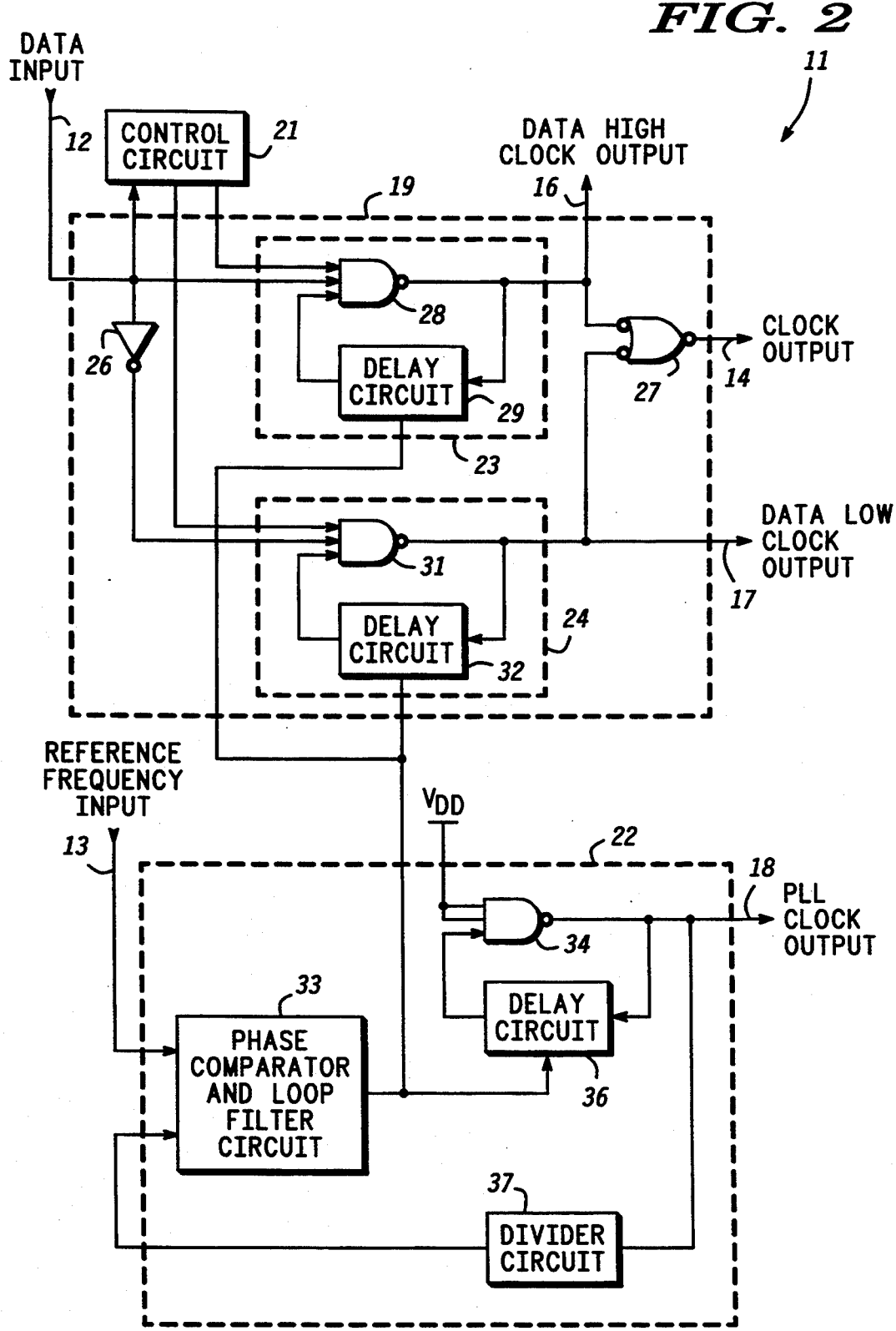
FIG. 2 is a block diagram of a serial data clock receiver circuit in accordance with the present invention.

FIG. 2 is a block diagram of a serial data clock receiver circuit 11. Serial data clock receiver circuit 11 is responsive to NRZ data for providing a clock signal synchronized to the NRZ data and prevents the clock signal from becoming asynchronous to NRZ data after an idle period when no data is transmitted. Serial data clock receiver circuit 11 has a data input 12, a reference frequency input 13, a clock output 14, a data high clock output 16, a data low clock output 17, and a phase lock loop (PLL) clock output 18.

Serial data clock receiver circuit 11 comprises a dual oscillator circuit 19, a control circuit 21, and a phase locked loop (PLL) circuit 22. Dual oscillator circuit 19 generates a clock signal synchronized to NRZ data applied to data input 12. Control circuit 21 enables and disables dual oscillator circuit 19 in conjunction with data received at data input 12. PLL circuit 22 generates a reference voltage that determines the frequency of the clock signal provided by dual oscillator circuit 19.

Dual oscillator circuit 19 comprises an oscillator 23, an oscillator 24, an inverter 26, and a NOR gate 27. Dual oscillator circuit 19 has a first enable input, a second enable input, a third enable input coupled to data input 12, a control input, a first output coupled to data high clock output 16, a second output coupled to data low clock output 17, and a third output coupled to clock output 14. In the preferred embodiment oscillators 23 and 24 are voltage controlled oscillators.

Oscillator 23 comprises a three input NAND gate 28 and a delay circuit 29. Three input NAND gate 28 has a first input and a second input coupled respectively to the first enable input and third enable input of dual oscillator circuit 19, a third input, and an output coupled to the first output of dual oscillator circuit 19. Delay circuit 29 has an input coupled to the output of NAND gate 28, a control input coupled to the control input of dual oscillator circuit 19, and an output coupled to the third input of NAND gate 28.

Oscillator 24 comprises a three input NAND gate 31 and a delay circuit 32. Three input NAND gate 31 has a first input coupled to the second enable input of dual oscillator circuit 19, a second input, a third input, and an output coupled to the second output of dual oscillator circuit 19. Delay circuit 32 has an input coupled to the output of NAND gate 31, a control input coupled to the control input of dual oscillator circuit 19, and an output coupled to the third input of NAND gate 31.

Inverter 26 has an input coupled to the third enable input of dual oscillator circuit 19 and an output coupled to the second input of NAND gate 31. NOR gate 27 has a first inverting input coupled to the output of NAND gate 28, a second inverting input coupled to the output of NAND gate 31, and an output coupled to the third output of dual oscillator circuit 19. In the preferred embodiment, oscillators 23 and 24 are matched for providing signals of substantially equal frequencies.

Control circuit 21 enables and disables oscillators 23 and 24 in conjunction with data received at data input 12. Control circuit 21 has an input coupled to data input 12, a first enable output and a second enable output coupled respectively to the first and second enable inputs of dual oscillator circuit 19.

PLL circuit 22 has an input coupled to reference frequency input 13, a control output coupled to the control input of dual oscillator circuit 19, and an output coupled to PLL clock output 18. PLL comprises a phase comparator and loop filter circuit 33, a three input NAND gate 34, a delay circuit 36, and a divider circuit 37. Phase comparator and loop filter circuit 33 has a first input coupled to the input of PLL circuit 22, a second input, and an output coupled to the control output of PLL circuit 22. NAND gate 34 has first and second inputs coupled for receiving an enabling signal (e.g. power supply voltage VDD), a third input, and an output coupled to the output of PLL circuit 22. Delay circuit 36 has an input coupled to the output of NAND gate 34, a control input coupled to the output of phase comparator and loop filter circuit 33, and an output coupled to the third input of NAND gate 34. Divider circuit 37 has an input coupled to the output of NAND gate 34 and an output coupled to the second input of phase comparator and loop filter circuit 33. In the preferred embodiment, NAND gate 34 and delay circuit 36 are substantially equal to oscillators 23 and 24.

Operation of serial data clock receiver circuit 11 is described hereinafter. A reference frequency is applied to reference frequency input 13. The reference frequency is typically generated by a crystal oscillator or other source that provides an accurate well controlled signal of a predetermined frequency. The PLL circuit 22 is phase locked and provides a stable free-running clock signal at PLL clock output 18. Phase comparator and loop filter circuit 33 provides a reference voltage at its output that determines the frequency of a voltage controlled oscillator comprising NAND gate 34 and delay circuit 36. The reference voltage is also coupled to the control input of oscillators 23 and 24 for generating signals substantially equal in frequency to that provided by PLL circuit 22.

Oscillators 23 and 24 of dual oscillator circuit 19 are enabled by control circuit 21 and the logic level of a data bit applied to data input 12. The signals provided by oscillators 23 and 24 are inverted and combined through NOR gate 27 to generate a clock signal at clock output 14. The clock signal is provided only when data is being received by serial data clock receiver circuit 11. Oscillator 23 is enabled by a high or one logic level at data input 12 and a high logic level at the first enable output of control circuit 21. Oscillator 24 is enabled by a low or zero logic level at data input 12 (inverted by inverter 26) and a high logic level at the second enable output of control circuit 21. Under normal operation when data is being sent continuously, both oscillators 23 and 24 receive enabling signals from control circuit 21. The logic level of an incoming data bit determines which oscillator is enabled. Note that enabling either oscillator 23 or 24 with the incoming data maintains synchronization between data and the clock signal of serial data clock receiver circuit 11.

In the preferred embodiment, incoming data applied to data input 12 is NRZ data with a sync bit that precedes each data byte. For example, assume a data byte comprises eight bits. A stream of data applied to data input 12 would appear as a sync bit followed by 8 bits of data, followed by another sync bit and 8 bits of data, this sequence being repeated until all the data is sent. The termination of data is signified by the absence of a sync bit after the last data bit. Data input 12 will remain at the logic level of the last bit sent.

Figure 3:
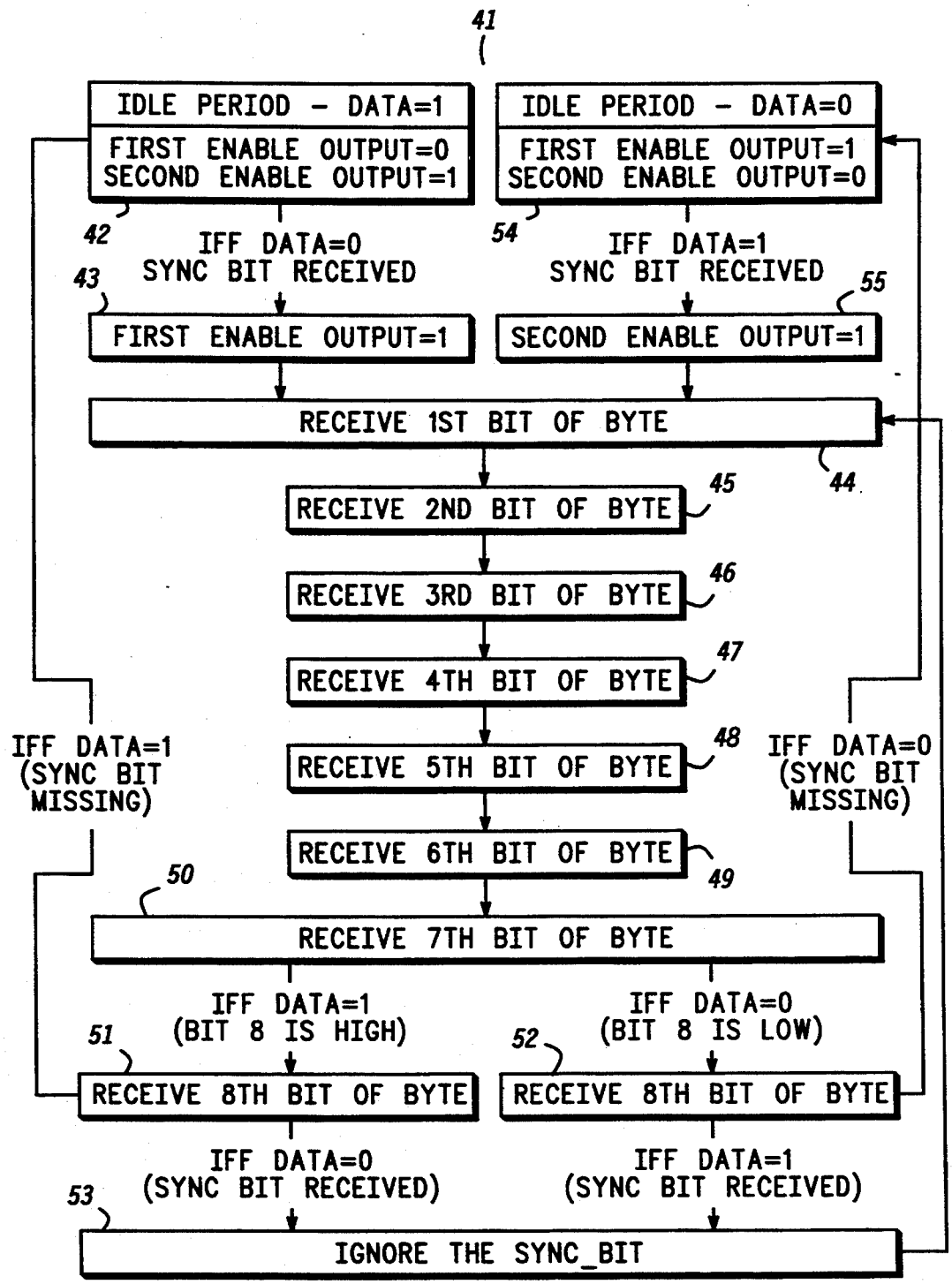
FIG. 3 is a state diagram for the operation of a control circuit of the serial data clock receiver circuit of FIG. 2.

FIG. 3 is a state diagram for the operation of control circuit 21 of serial data clock receiver circuit 11 of FIG. 2. Control circuit 21 arms oscillators 23 and 24 for being enabled by incoming data and prevents oscillators 23 and 24 from becoming asynchronous with the data and causing a metastable condition. The state diagram of FIG. 3 is shown having a data byte of eight bits thereby corresponding to the example described hereinabove. It should be obvious to one skilled in the art that a data byte length is constrained only by the amount of time oscillators 23 and 24 are allowed to drift before being resynchronized with the incoming NRZ data.

Referring back to FIG. 2, operation of control circuit 21 is described hereinafter. A high or low logic level is applied to data input 12 corresponding to the last logic bit transmitted before an idle period. An idle period begins when a sync bit is not received after a data byte. For example, assume the last logic bit transmitted before an idle period is a one logic level. The one logic level remains at data input 12 during the idle period when no data is sent. Control circuit 21 provides a zero logic level at the first enable output and a one logic level at the second enable output, this is illustrated in a box 42 of state diagram 41 of FIG. 3. Oscillator 24 is armed for being enabled when the data changes from a one to a zero logic level. Control circuit 21 disables oscillator 23. During the idle period no clock signal is provided at clock output 14.

A transition from the one logic level to a zero logic level at data input 12 corresponds to serial data clock receiver circuit 11 receiving a sync bit. Oscillator 24 is enabled by the zero logic level. The first enable output of control circuit 21 transitions from the zero logic level to a one logic level arming oscillator 23 for being enabled, this is illustrated in box 43 of state diagram 41.

Seven data bits are then received by control circuit 21 as illustrated in boxes 44-50 of state diagram 41. The eighth bit determines the logic level of the next sync bit. The sync bit must be the opposite of the logic level of the eighth bit. For example, if the eighth bit is a one logic level the next sync bit must be a zero logic level. The two logic states of the eighth bit are illustrated in boxes 51 and 52 of state diagram 41 of FIG. 3.

If the eighth bit is a one logic level (box 51 of FIG. 3) and a sync bit (zero logic level) is not detected by control circuit 21 during the next clock cycle, an idle period occurs. Control circuit 21 provides a zero logic level and a one logic level at the first and second enable outputs respectively as indicated in box 42 of FIG. 3. Oscillators 24 is armed for being enabled when the next sync bit (zero logic level) arrives.

If the eighth bit is a one logic level and a sync bit (zero logic level) is detected by control circuit 21 during the next clock cycle a new data byte is to be received by serial data clock receiver circuit 11. The sync bit is ignored (box 53 of FIG. 3) and control circuit 21 begins to receive the next data byte (return to box 44 of FIG. 3).

If the eighth bit is a zero logic level (box 52 of FIG. 3) and a sync bit (one logic level) is not detected by control circuit 21 during the next clock cycle an idle period occurs. Control circuit 21 provides a one logic level and a zero logic level at the first and second enable outputs respectively as indicated in box 54 of FIG. 3. Oscillator 23 is armed for being enabled when the next sync bit (one logic level) arrives.

If the eighth bit is a zero logic level and a sync bit (one logic level) is detected by control circuit 21 during the next clock cycle a new data byte is to be received by serial data clock receiver circuit 11. The sync bit is ignored (box 53 of FIG. 3) and control circuit 21 begins to receive the next data byte (return to box 44 of FIG. 3).

Control circuit 21 provides a means for disabling oscillators 23 and 24 during an idle period and an orderly process for synchronizing a clock signal to data received by serial data clock receiver circuit 11. Boxes 54 and 55 of FIG. 3 illustrate the sequence of events that occur when the last transmitted bit before an idle period has a zero logic level. The process is similar to that described above for boxes 42 and 43 of FIG. 3.

Figure 4:
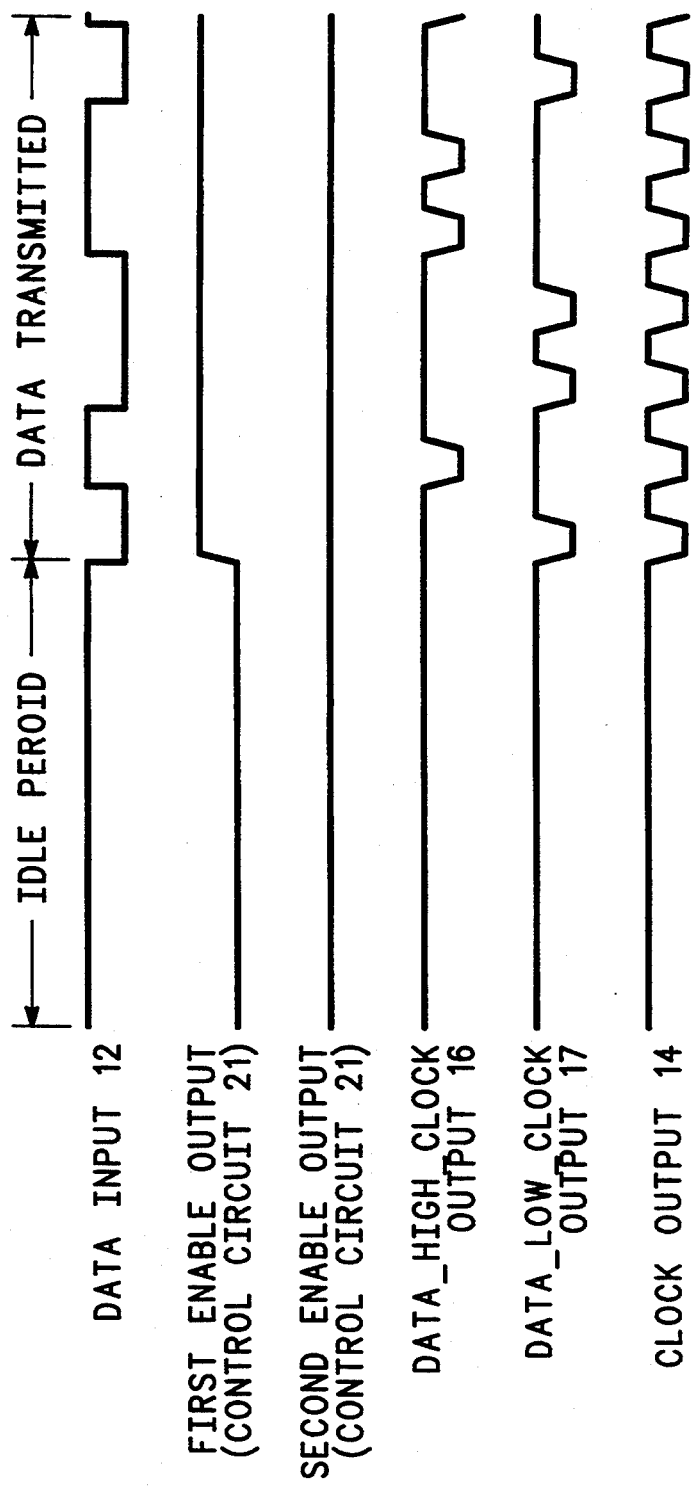
FIG. 4 is a timing diagram illustrating a high idle period and the serial data clock receiver circuit of FIG. 2 response to a sync bit.

FIG. 4 is a timing diagram illustrating serial data clock receiver circuit 11 of FIG. 2 during an idle period and a transmission period. Data input 12 of FIG. 2 remains at the logic level of the last data bit sent before the idle period, in this example the last data bit was a one logic level. The first enable output (zero logic level) of control circuit 21 (FIG. 2) disables oscillator 23 (FIG. 2). The second enable output (one logic level) of control circuit 21 (FIG. 2) arms oscillator 24 (FIG. 2) for being enabled by a sync bit.

Upon receiving a sync bit (zero logic level) oscillator 24 is enabled. The zero logic level of the sync bit is inverted by inverter 26 (FIG. 2) before being received by oscillator 24. The first enable output of control circuit 21 transitions from the zero logic level to a one logic level arming oscillator 23 for being enabled. A data byte follows the sync bit. A logic level of each data bit received by serial data clock receiver circuit 11 determines whether oscillator 23 or oscillator 24 is enabled. The outputs of oscillators 23 and 24 are inverted and coupled through NOR gate 27 (FIG. 2) to provide a clock signal at clock output 14. Thus, the clock signal is kept synchronized to the incoming data via the sync bit and the logic level of each data bit.

Figure 5:
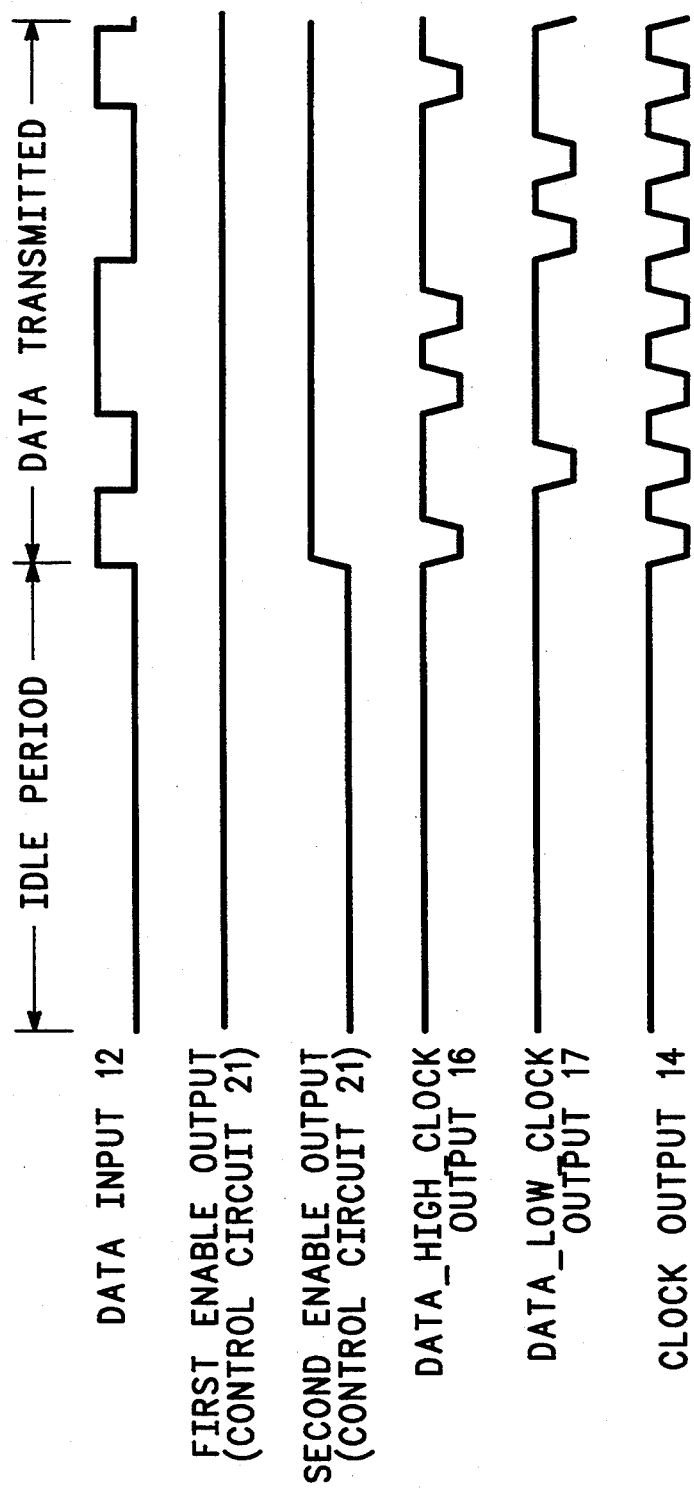
FIG. 5 is a timing diagram illustrating a low idle period and the serial data clock receiver circuit of FIG. 2 response to a sync bit.

FIG. 5 is a timing diagram illustrating serial data clock receiver circuit 11 of FIG. 2 during an idle period and a transmission period. In this example, data input 12 of FIG. 2 is at a zero logic level corresponding to the last data bit sent before the idle period. The first enable output (one logic level) of control circuit 21 (FIG. 2) arms oscillator 23 (FIG. 2) for being enabled by a sync bit. The second enable output (zero logic level) of control circuit 21 (FIG. 2) disables oscillator 24.

Upon receiving a sync bit (one logic level) oscillator 23 is enabled. The second enable output of control circuit 21 transitions from a zero logic level to a one logic level arming oscillator 24 for being enabled. A data byte follows the sync bit. A logic level of each data bit received by serial data clock receiver circuit 11 determines whether oscillator 23 or 24 is enabled. The outputs of oscillators 23 and 24 are coupled to NOR gate 27 (FIG. 2) for combining to form a clock signal synchronized to the incoming data.

Figure 6:
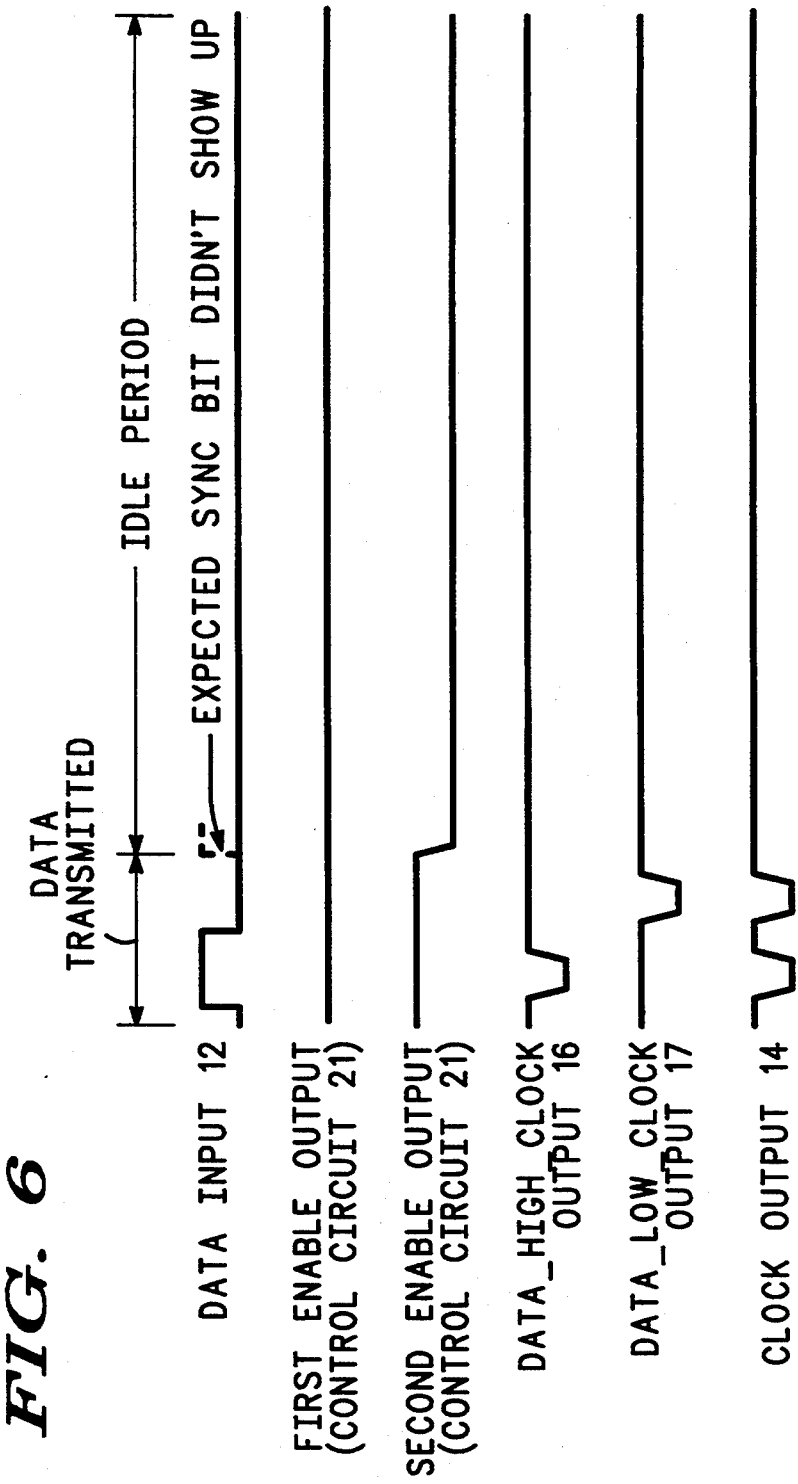
FIG. 6 is a timing diagram illustrating the serial data clock receiver circuit of FIG. 2 response to a missing sync bit.

FIG. 6 is a timing diagram illustrating serial data clock receiver circuit 11 of FIG. 2 receiving transmitted data wherein a sync bit is not received after a last data bit (zero logic level). Two data bits are shown in FIG. 6 being received by serial data clock receiver circuit 11, a one logic level followed by a zero logic level. Both the first and second enable outputs of control circuit 21 (FIG. 2) are at a one logic level for arming oscillators 23 and 24 (FIG. 2) for being enabled.

Oscillator 23 is enabled during the one logic level data bit followed by oscillator 24 being enabled by the zero logic level data bit (last bit). Control circuit 21 (FIG. 2) expects a one logic level sync bit after the last bit (zero logic level). When the sync bit is not received the second enable output of control circuit 21 transitions from the one logic level to a zero logic level disabling oscillator 24. The first enable output of control circuit 21 remains high to arm oscillator 23 for being enabled by a sync bit (one logic level). Serial data clock receiver circuit 11 is prepared for an idle period.

By now it should be appreciated that a serial data clock receiver circuit has been provided for synchronizing a clock signal to incoming data. The serial data clock receiver circuit maintains clock signal to data synchronization by periodically resynchronizing when a sync bit is received. The serial data clock receiver also resynchronizes the clock signal to data when a data transition occurs. During an idle period the serial data clock receiver circuit is disabled (no clock signal) but armed for receiving a sync bit thereby preventing a free running clock from becoming asynchronous with incoming data.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. A serial data clock receiver circuit for providing a clock signal synchronized to a plurality of data bits comprising a dual oscillator circuit having a data input for receiving the plurality of data bits and a clock output for providing a clock signal synchronized to the plurality of data bits, said dual oscillator circuit including first and second oscillators, said first oscillator being enabled by a data bit of a first logic level, said second oscillator being enabled by a data bit of a second logic level, and said first and second oscillators being disabled during an idle period.

2. The serial data clock receiver circuit as recited in claim 1 wherein said dual oscillator circuit comprises:
   a first voltage controlled oscillator corresponding to said first oscillator having a first enable input coupled to receive said data input, a second enable input, a control input, and an output;
   a second voltage controlled oscillator corresponding to said second oscillator having a first enable input coupled for receiving an inversion of said plurality of data bits applied to said data input, a second enable input, a control input, and an output; and
   a NOR gate having a first inverting input coupled to said output of said first voltage controlled oscillator, a second inverting input coupled to said output of said second voltage controlled oscillator, and an output coupled to said clock output.

3. The serial data clock receiver circuit as recited in claim 2 further including a phase locked loop having a reference frequency input and a reference voltage output coupled to said control inputs of said first and second voltage controlled oscillators.

4. The serial data clock receiver circuit as recited in claim 3 wherein said phase locked loop comprises:
   a phase comparator and loop filter circuit having an input coupled to said reference frequency input of said phase locked loop, a feedback input, and an output coupled to said reference voltage output of said phase locked loop;
   a voltage controlled oscillator having a first enable input and a second enable input coupled for being enabled, a control input coupled to said reference voltage output, and an output, said voltage controlled oscillator being matched to said first and second voltage controlled oscillators for having substantially similar characteristics; and
   a divider circuit having an input coupled to said output of said voltage controlled oscillator and an output coupled to said feedback input of said phase comparator and loop filter circuit.

5. The serial data clock receiver circuit as recited in claim 4 wherein said first and second voltage controlled oscillators and said voltage controlled oscillator of said phase locked loop provide signals of substantially equal frequencies.

6. The serial data clock receiver circuit as recited in claim 2 further including a control circuit for enabling and disabling said first and second voltage controlled oscillators, said control circuit having an input coupled to said data input of said dual oscillator circuit, a first enable output coupled to said second enable input of said first voltage controlled oscillator, and a second enable output coupled to said second enable input of said second voltage controlled oscillator.

7. The serial data clock receiver circuit as recited in claim 6 wherein a synchronizing bit precedes a data byte for periodically resynchronizing the clock signal of the serial data clock receiver circuit to said data byte.

8. The serial data clock receiver circuit as recited in claim 7 wherein said control circuit is responsive to an absence of a synchronizing bit and wherein said control circuit disables said first and second voltage controlled oscillators when a synchronizing bit is not detected.

9. The serial data clock receiver circuit as recited in claim 8 wherein said control circuit arms either said first or second voltage controlled oscillator for being responsive to a synchronizing bit during an idle period.

10. A serial data clock receiver circuit for providing a clock signal synchronized to a plurality of data bits including a data input and a clock output, the serial data clock receiver circuit comprising:
    a dual oscillator circuit having an input coupled to the data input, a first enable input, a second enable input, a control input, and an output coupled to the clock output;
    a phase locked loop for generating a reference voltage having a reference frequency input and a reference voltage output coupled to said control input of said dual oscillator circuit; and
    a control circuit for enabling and disabling said dual oscillator circuit having an input coupled to the data input, first and second enable outputs coupled respectively to said first and second enable inputs of said dual oscillator circuit, said control circuit disabling said dual oscillator circuit during an idle period.

11. The serial data clock receiver circuit as recited in claim 10 wherein a data byte is a predetermined number of data bits and wherein a synchronizing bit precedes each data byte for resynchronizing the clock signal to said data byte.

12. The serial data clock receiver circuit as recited in claim 11 wherein said control circuit is responsive to an absence of a synchronizing bit for disabling said dual oscillator circuit from providing the clock signal.

13. The serial data clock receiver circuit as recited in claim 12 wherein said control circuit arms said dual oscillator circuit for being responsive to a synchronizing bit during an idle period.

14. The serial data clock receiver circuit as recited in claim 13 wherein said dual oscillator circuit comprises:
    a first voltage controlled oscillator having a first enable input, a second enable input, and a control input coupled respectively to said first enable input, said input, and said control input of said dual oscillator circuit, and an output;
    an inverter having an input coupled to said input of said dual oscillator circuit and an output; and
    a second voltage controlled oscillator having a first enable input, a second enable input, and a control input coupled respectively to said second enable input, said output of said inverter, and said control input of said dual oscillator circuit, and an output;

a NOR gate having a first inverting input coupled to said output of said first voltage controlled oscillator circuit, a second inverting input coupled to said output of said second voltage controlled oscillator, and an output coupled to said output of said dual oscillator circuit.

15. The serial data clock receiver circuit as recited in claim 14 wherein said first voltage controlled oscillator is responsive to a data bit of a first logic level and said second voltage controlled oscillator is responsive to a data bit of a second logic level, wherein said control circuit arms said first voltage controlled oscillator for being responsive to a synchronizing bit of a first logic level when a last data bit sent prior to an idle period is a second logic level, and wherein said control circuit arms said second voltage controlled oscillator for being responsive to a synchronizing bit of a second logic level when said last data bit sent prior to said idle period is a first logic level.

16. The serial data clock receiver circuit as recited in claim 15 wherein said phase locked loop comprises:

a phase comparator and loop filter circuit for generating a reference voltage having an input coupled to said reference frequency input of said phase locked loop, a feedback input, and an output coupled to said reference voltage output of said phase locked loop;

a voltage controlled oscillator having first and second enable inputs for receiving an enable signal, a control input coupled to said output of said phase comparator and loop filter, and an output coupled to said output of said phase locked loop; and a divider circuit having an input coupled to said output of said voltage controlled oscillator and an output coupled to said feedback input of said phase comparator and loop filter circuit.

17. The serial data clock receiver circuit as recited in claim 16 wherein said voltage controlled oscillator, said first voltage controlled oscillator, and said second voltage controlled oscillator are matched to one another and generate substantially equal frequencies.

18. A method for synchronizing a clock signal to a plurality of data bits being transmitted after an idle period, the method comprising:

disabling the clock signal during the idle period thereby preventing the clock signal from drifting;

detecting a presence of data;

providing the clock signal when the data is detected thereby synchronizing the clock signal to the data; and enabling either a first or a second oscillator for providing the clock signal wherein said first oscillator is responsive to a synchronizing bit of a first logic level and said second oscillator is responsive to a synchronizing bit of a second logic level.

* * * * *